(12) United States Patent
Shodai

(10) Patent No.: US 12,210,268 B2
(45) Date of Patent: Jan. 28, 2025

(54) LENS BARREL AND CAMERA EQUIPPED WITH SAME

(71) Applicant: Panasonic Intellectual Property Management Co., Ltd., Osaka (JP)

(72) Inventor: Masayuki Shodai, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 195 days.

(21) Appl. No.: 18/116,344

(22) Filed: Mar. 2, 2023

(65) Prior Publication Data

US 2024/0176213 A1    May 30, 2024

(30) Foreign Application Priority Data

Nov. 29, 2022    (JP) .................................. 2022-190303

(51) Int. Cl.
*G03B 17/12*    (2021.01)
*G03B 5/02*    (2021.01)

(52) U.S. Cl.
CPC ............... *G03B 17/12* (2013.01); *G03B 5/02* (2013.01); *G03B 2205/0046* (2013.01)

(58) Field of Classification Search
None
See application file for complete search history.

(56) References Cited

U.S. PATENT DOCUMENTS

| | | | |
|---|---|---|---|
| 8,248,709 B2 | 8/2012 | Tsuji | |
| 2011/0032626 A1 | 2/2011 | Tsuji | |
| 2011/0102910 A1* | 5/2011 | Yoshii | G02B 7/102 |
| | | | 359/699 |
| 2018/0113375 A1* | 4/2018 | Hasegawa | G02B 27/646 |
| 2020/0264400 A1* | 8/2020 | Ito | G02B 7/10 |

FOREIGN PATENT DOCUMENTS

| | | | | |
|---|---|---|---|---|
| CN | 104035181 A | * | 9/2014 | ............... G02B 7/04 |
| JP | 2010186192 A | * | 8/2010 | |
| JP | 2011-039180 A | | 2/2011 | |
| JP | 2011-039388 A | | 2/2011 | |
| JP | 2014142666 A | * | 8/2014 | ............... G02B 7/04 |
| JP | 2015-118117 A | | 6/2015 | |

* cited by examiner

*Primary Examiner* — Clayton E. LaBalle
*Assistant Examiner* — Diana Hancock
(74) *Attorney, Agent, or Firm* — Renner, Otto, Boisselle & Sklar, LLP

(57) ABSTRACT

A lens barrel 10 comprises fourth lenses L4a and L4b, a substantially cylindrical fourth lens group unit 20, and a substantially cylindrical cam frame 14. The fourth lens group unit 20 holds the fourth lenses L4a and L4b and has a plurality of cam pins 22a to 22c and 23 protruding in the radial direction. The cam frame 14 is disposed substantially coaxially with the fourth lens group unit 20, and has a plurality of cam grooves 14c that are formed in a direction intersecting the optical axis direction and engage with the cam pins 22a to 22c and 23; assembly grooves 14d and 14f that are provided contiguously with the cam groove 14c, engage with the cam pins 22a to 22c and 23 in the mounting and assembly of the fourth lens group unit 20, and guide these cam pins from the end portion to the cam groove 14c in the optical axis direction; and a concave portion 14g that holds the cam pin 23 in the assembly groove 14f in the assembly of the fourth lens group unit 20.

14 Claims, 14 Drawing Sheets

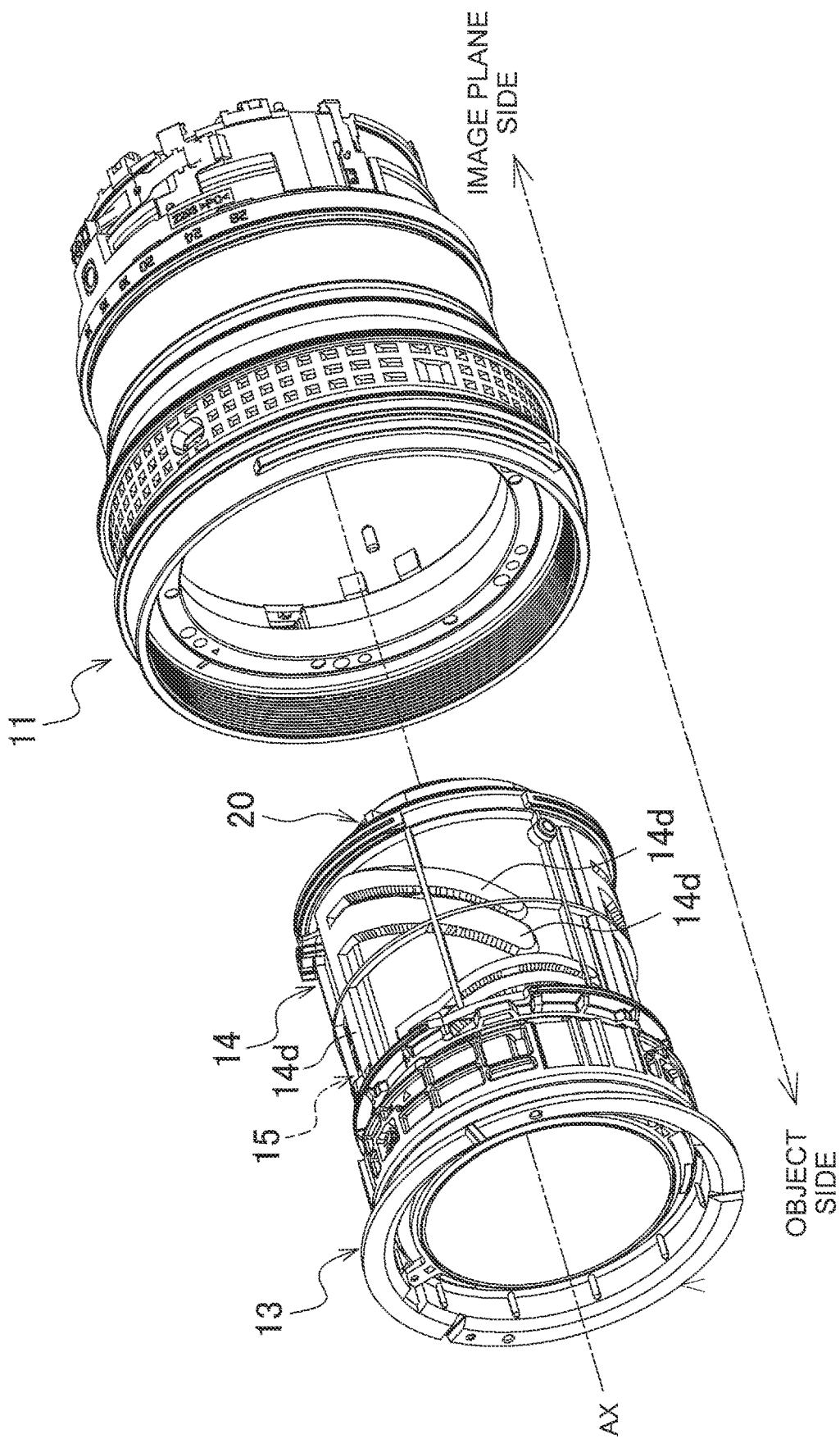

LENS BARREL AND CAMERA EQUIPPED WITH SAME

CROSS-REFERENCE TO RELATED APPLICATIONS

This application claims priority to Japanese Patent Application No. 2022-190303 filed on Nov. 29, 2022. The entire disclosure of Japanese Patent Application No. 2022-190303 is hereby incorporated herein by reference.

BACKGROUND

Technical Field

The present disclosure relates to a lens barrel and a camera equipped with this lens barrel.

Description of the Related Art

Lens barrels that are equipped with an optical system including a plurality of lenses, and that are replaceably attached to a camera body have been used in recent years.

For example, Patent Literature 1 discloses a lens barrel designed such that a plurality of movable frames can be efficiently incorporated into a cam barrel without reducing latitude in the design of the cam pins, in which the cam barrel has an insertion groove that is formed contiguous with a first cam groove and a second cam groove and contiguous with one end of the cam barrel, and into which a first cam pin and a second cam pin can be inserted, and the distance in the optical axis direction between a first position where the first cam groove and the insertion groove are connected and a second position where the second cam groove and the insertion groove are connected is substantially equal to the distance in the optical axis direction between the first cam pin and the second cam pin in a state in which the first cam pin and the second cam pin have been inserted into the insertion groove and a first moving body and a second moving body have come into contact with each other.

CITATION LIST

Patent Literature

Patent Literature 1: JP-A 2015-118117

SUMMARY

Problem to be Solved by the Invention

However, the following problem is encountered with the conventional lens barrel described above.

With the lens barrel disclosed in the above-mentioned publication, in a state in which the lens frame and the cam barrel are assembled, the lens frame is able to rotate relative to the cam barrel. Therefore, when the assembly including the lens frame and the cam barrel is mounted to an exterior unit or the like, if the lens frame should be rotated unintentionally with respect to the cam barrel, causing a phase shift with respect to the exterior unit or the like, this can make the lens barrel more difficult to assemble.

It is an object of the present disclosure to provide a lens barrel that can be assembled more easily than in the past, as well as a camera equipped with this lens barrel.

Means for Solving Problem

The lens barrel according to the present disclosure comprises at least one lens group, a substantially cylindrical lens frame, and a substantially cylindrical cam barrel. The substantially cylindrical lens frame holds the lens group and has a plurality of cam pins that protrude in the radial direction. The substantially cylindrical cam barrel is disposed substantially coaxially with the lens frame, is rotated relative to the lens frame to move the lens group in the optical axis direction, and has a plurality of cam grooves, assembly grooves, and a latching portion. The plurality of cam grooves are formed in a direction intersecting the optical axis direction and engage with the plurality of cam pins in order to move the lens group in the optical axis direction. The assembly grooves are provided contiguous with the cam grooves, and guide the cam pins from an end portion in the optical axis direction to the cam grooves. The latching portion is provided to the assembly grooves and holds the cam pins at a specific latching position that is ahead of where the assembly grooves are connected to the cam grooves when the lens frame is installed.

Effects

With the lens barrel according to the present disclosure, assembly is easier than in the past.

BRIEF DESCRIPTION OF THE DRAWINGS

FIG. 15 is an oblique view showing a state in which the assembly of the first lens group unit, the cam frame, and the fourth lens group unit in FIG. 3 is mounted into a focus ring unit.

DETAILED DESCRIPTION OF THE EMBODIMENT

Embodiments will now be described through reference to the drawings. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Embodiment 1

A lens barrel 10 according to an embodiment of the present disclosure, and a camera 1 equipped with the lens barrel 10, will now be described with reference to FIGS. 1 to 15.

Figure 1:
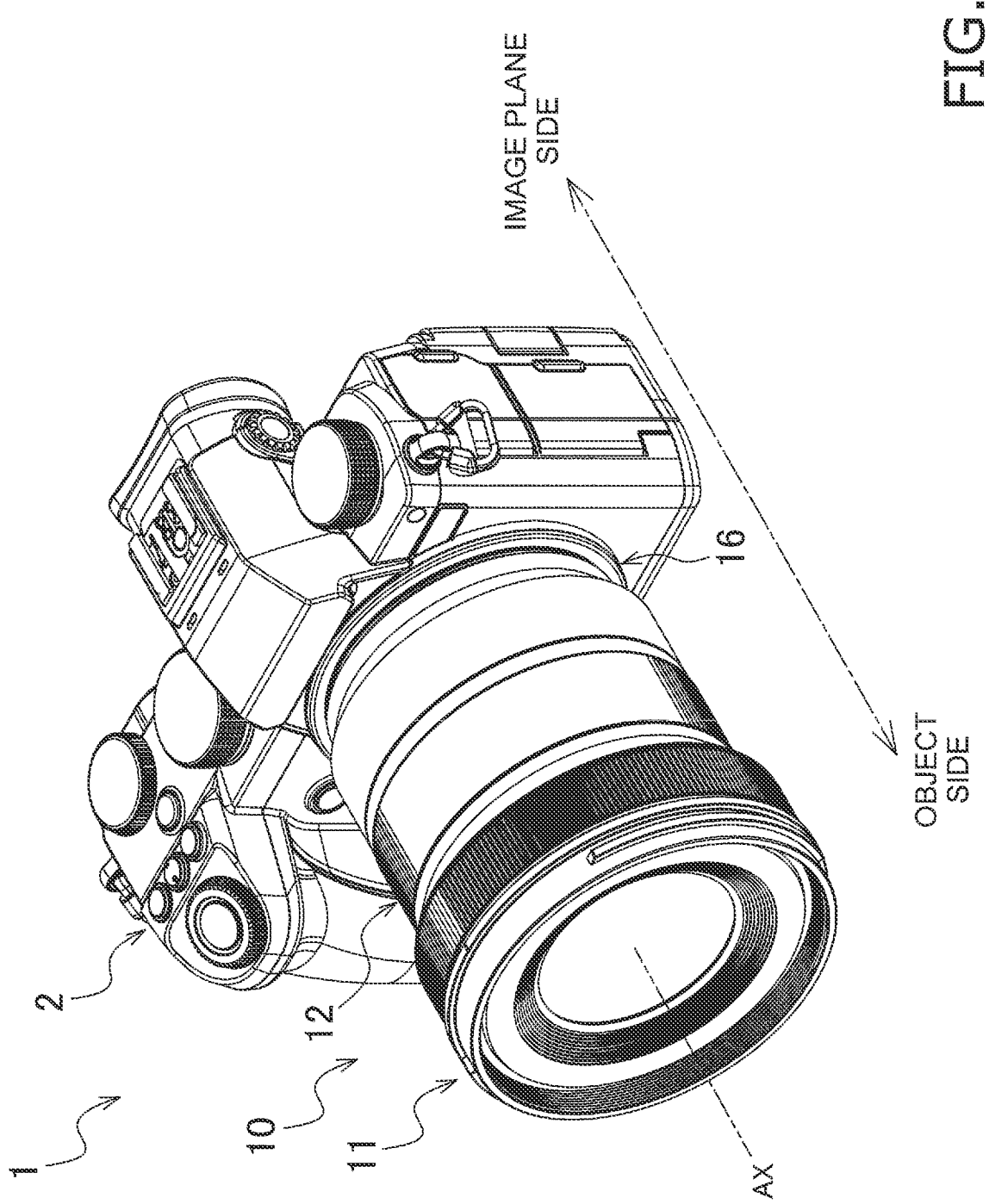
FIG. 1 is an oblique view of the external configuration of a camera in which the lens barrel according to an embodiment of the present disclosure has been attached to a camera body.

A camera 1 according to this embodiment comprises a lens barrel 10 and a camera body 2 to which the lens barrel 10 is removably attached, as shown in FIG. 1.

Configuration of Lens Barrel 10

Figure 2:
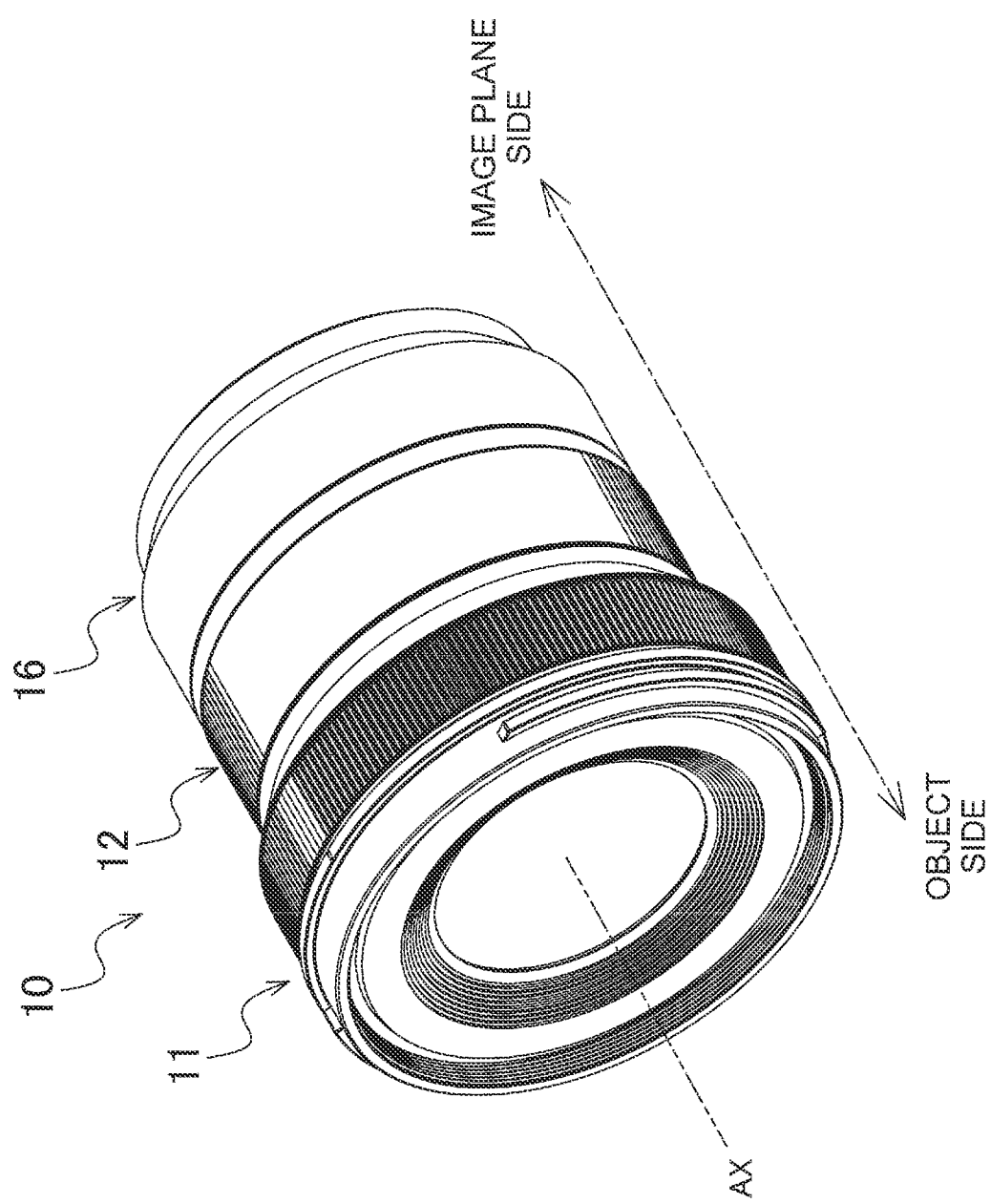
FIG. 2 is an oblique view of the external configuration of the lens barrel in FIG. 1.
Figure 3:
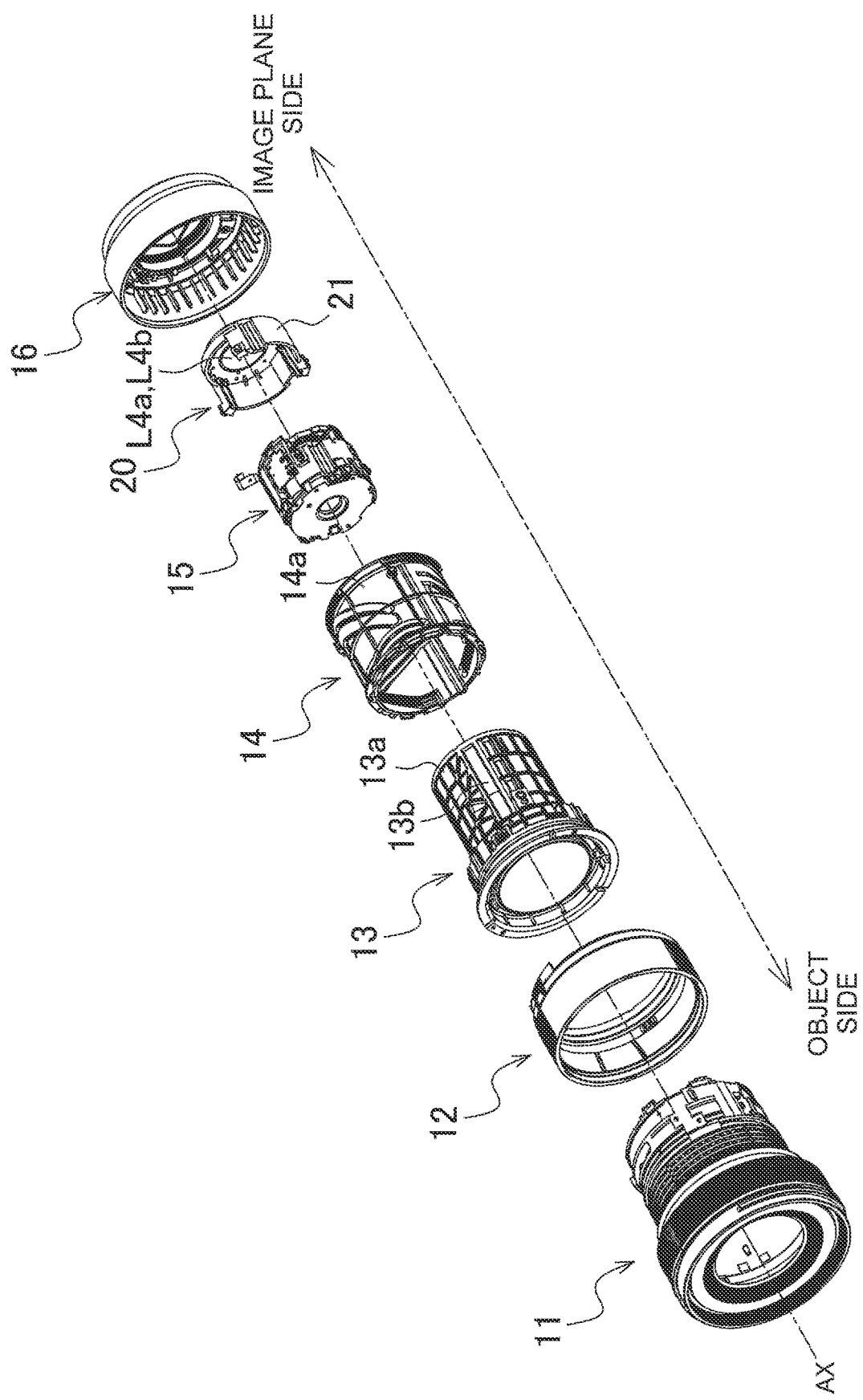
FIG. 3 is an exploded oblique view of the configuration of the lens barrel in FIG. 2.

As shown in FIGS. 2 and 3, the lens barrel 10 comprises a focus ring unit 11, a zoom ring 12, a first lens group unit 13, a cam frame (cam barrel) 14, second and third lens group units 15, a fourth lens group unit (lens frame) 20, and a rear frame unit 16.

As shown in FIG. 3, the focus ring unit 11 is a substantially cylindrical member that is disposed closest to the object in the optical axis AX direction, among all the components constituting the lens barrel 10, and the zoom ring 12 that is rotated by the user is mounted on the outer peripheral surface thereof.

As shown in FIG. 3, the zoom ring 12 is a substantially annular member that is mounted on the outer peripheral surface of the focus ring unit 11, and is rotated by the user to move the relative positions of the lenses included in the lens barrel 10 and thereby perform a zoom operation.

As shown in FIG. 3, the first lens group unit 13 is a substantially cylindrical member that is disposed on the inner peripheral surface side of the focus ring unit 11, and holds the first lens group lenses on its inner peripheral surface side.

As shown in FIG. 3, the cam frame 14 is disposed on the outer peripheral surface side of the first lens group unit 13, and has a substantially cylindrical main body portion 14a, a plurality of cam grooves 14b and 14c formed in the main body portion 14a, and assembly grooves 14d, 14e, and 14f (discussed below) (see FIG. 14A, etc.).

As shown in FIG. 3, the second and third lens group units 15 are substantially annular members that are enclosed on the inner peripheral surface side of the first lens group unit 13, and hold second lens group lenses and third lens group lenses on the inner peripheral surface side thereof. The second and third lens group units 15 are disposed between the first lens group unit 13 and the fourth lens group unit 20 in the optical axis AX direction of the lens barrel 10.

As shown in FIG. 3, the fourth lens group unit 20 is disposed on the image plane side of the second and third lens group units 15 in the optical axis AX direction, and holds lenses L4a and L4b on its inner peripheral surface side.

The detailed configuration of the fourth lens group unit 20 will be described below.

As shown in FIG. 3, the rear frame unit 16 is a substantially cylindrical member that is disposed closest to the image plane in the optical axis AX direction, among all the components constituting the lens barrel 10, and is mounted to a mounting portion on the camera body 2 side (not shown).

Configuration of Fourth Lens Group Unit 20

Figure 4A:
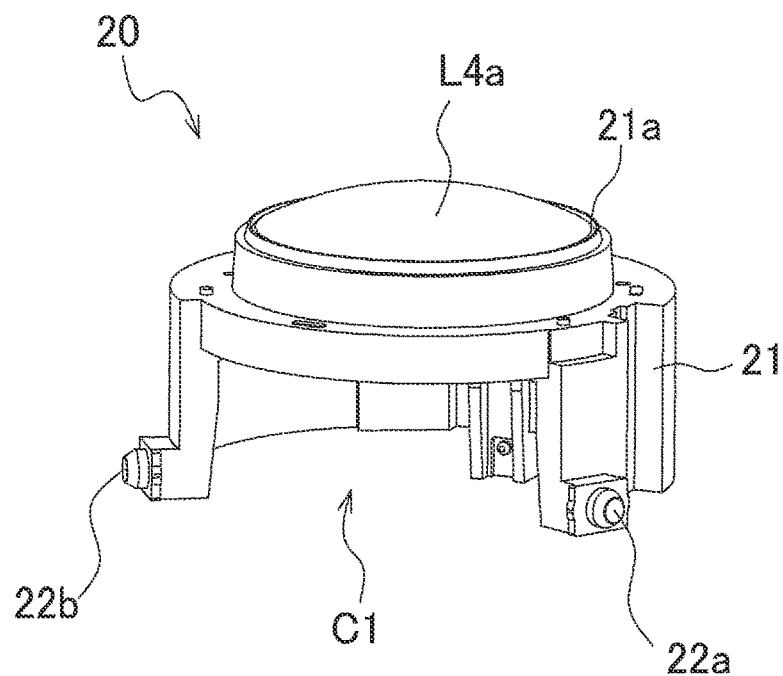
FIG. 4A is an oblique view of the configuration of the cutout side of a fourth lens group unit included in the lens barrel of FIG. 3.
Figure 4B:
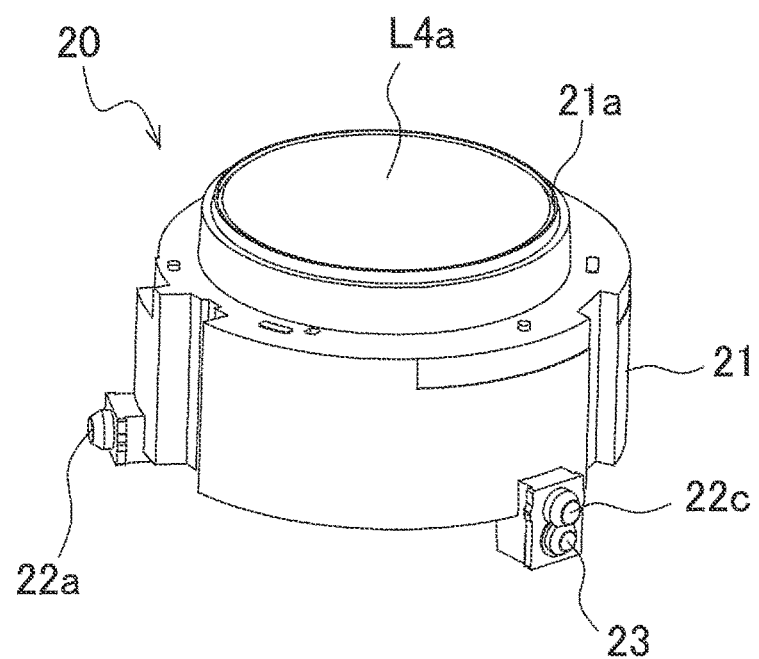
FIG. 4B is an oblique view of the configuration of a biasing pin provided on the opposite side from the cutout portion of the fourth lens group unit included in the lens barrel of FIG. 3.

The fourth lens group unit 20 included in the lens barrel 10 of this embodiment has a substantially cylindrical outer shape and is molded by resin injection molding or the like. As shown in FIGS. 4A and 4B, the fourth lens group unit 20 has a substantially cylindrical main body portion 21, three cam pins 22a, 22b, and 22c, and a biasing pin (cam pin) 23.

The substantially cylindrical main body portion 21 holds the lenses L4a and L4b (see FIG. 5B) used in the optical system on its inner peripheral portion (lens holding portion 21a). The main body portion 21 is provided with the cam pins 22a, 22b, and 22c and the biasing pin (cam pin) 23 on its outer peripheral portion. The main body portion 21 is formed integrally with the cam pins 22a, 22b, and 22c by injection molding using a resin.

Figure 5A:
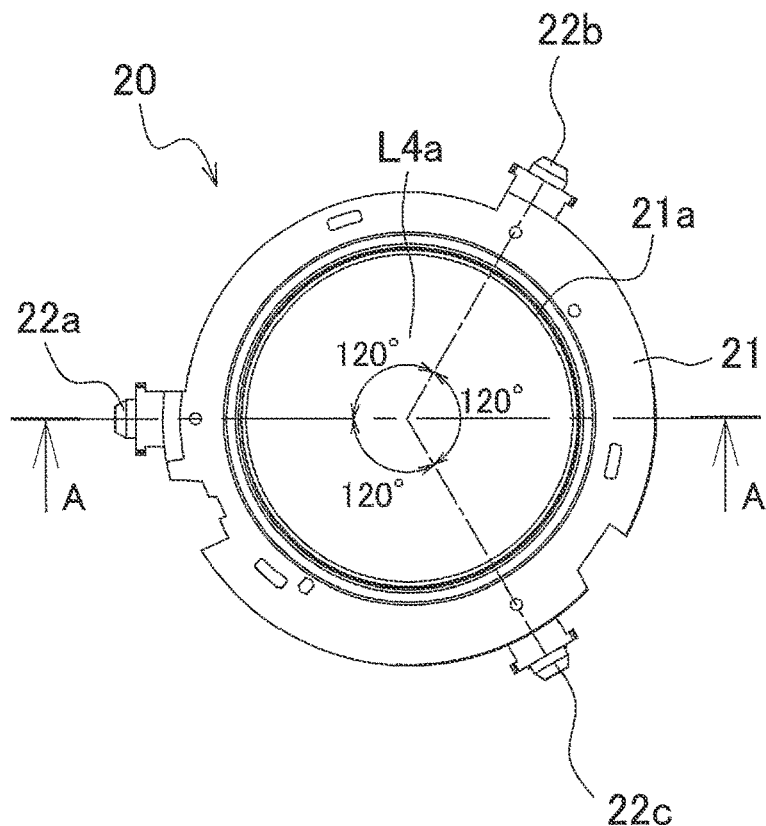
FIG. 5A is a top view of the fourth lens group unit shown in FIG. 4A, etc.

The cam pins 22a, 22b, and 22c have a substantially truncated conical shape formed from a PC (polycarbonate) resin, for example, and as shown in FIG. 5A, are provided on the outer peripheral surface of the main body portion 21 at substantially equal angular intervals (approximately 120 degrees). Also, the three cam pins 22a, 22b, and 22c are provided on the outer peripheral surface of the main body portion 21 so as to protrude outward in the radial direction of a circle centered on the optical axis AX, and engage with the cam grooves 14c via the assembly grooves 14d and 14f (see FIGS. 14A and 14B) formed in the main body portion 14a of the cam frame 14. The cam pins 22a, 22b, and 22c move along the cam grooves 14c during photography with the camera 1 (operation section). The cam pins 22a, 22b, and 22c are disposed at the end portion of the main body portion 21 on the object side in the optical axis AX direction.

Figure 5B:
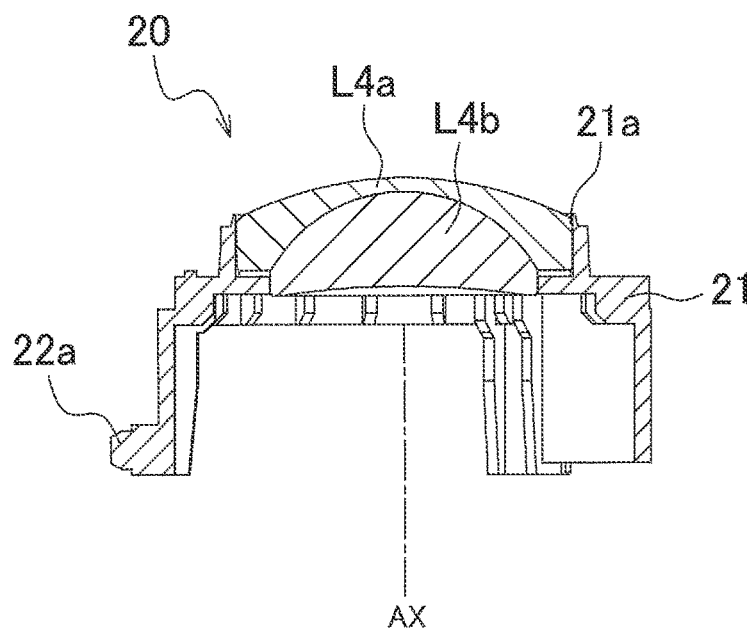
FIG. 5B is a cross-sectional view along the A-A line in FIG. 5A.

As shown in FIGS. 5A and 5B, the cam pin 22a (first cam pin) is provided on the outer peripheral surface of the main body portion 21 so as to protrude outward in the radial direction of a circle centered on the optical axis AX. The cam pin 22a engages with the cam groove 14c provided to the substantially cylindrical main body portion 14a of the cam frame 14 disposed on the outer peripheral surface side of the fourth lens group unit 20.

As shown in FIG. 5A, the cam pin 22b (first cam pin) is provided at a position about 120 degrees clockwise from the cam pin 22a on the outer peripheral surface of the main body portion 21, so as to protrude outward in the radial direction of a circle centered on the optical axis AX. Like the cam pin 22a, the cam pin 22b engages with the cam groove 14c provided to the substantially cylindrical main body portion 14a of the cam frame 14 disposed on the outer peripheral surface side of the fourth lens group unit 20.

Figure 6A:
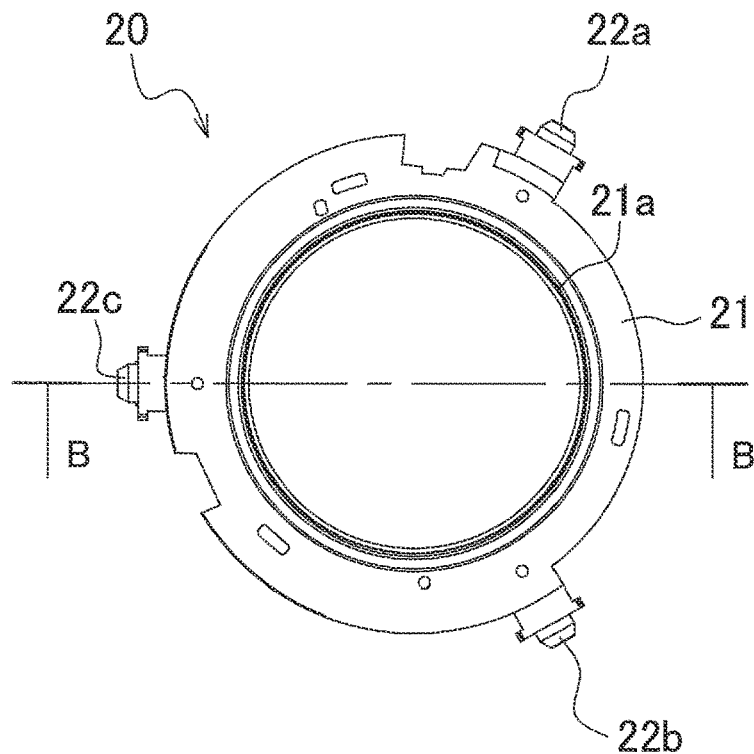
FIG. 6A is a top view of the fourth lens group unit shown in FIG. 4A, etc.
Figure 6B:
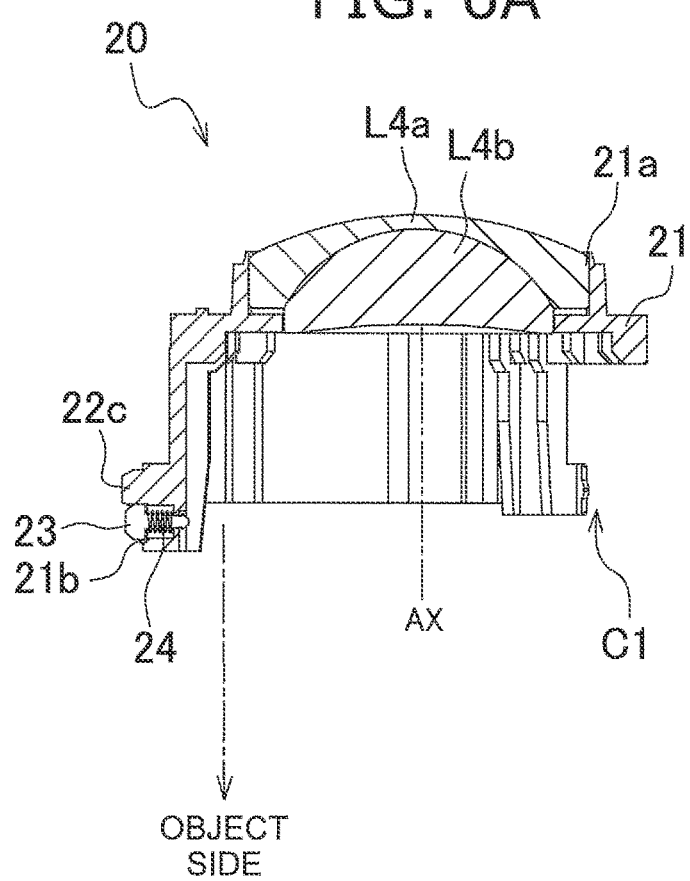
FIG. 6B is a cross-sectional view along the B-B line in FIG. 6A.

As shown in FIGS. 6A and 6B, the cam pin 22c (second cam pin) is provided at a position approximately 120 degrees clockwise from the cam pin 22b on the outer peripheral surface of the main body portion 21, so as to protrude outward in the radial direction of a circle centered on the optical axis AX. Like the cam pins 22a and 22b, the cam pin 22c engages with the cam groove 14c provided to the substantially cylindrical main body portion 14a of the cam frame 14 disposed on the outer peripheral surface side of the fourth lens group unit 20.

The biasing pin 23 is provided near the cam pin 22c, among the three resin cam pins 22a, 22b, and 22c provided on the outer peripheral surface of the main body portion 21. More precisely, the biasing pin 23 is disposed adjacent to the cam pin 22c on the object side in the optical axis AX direction.

The biasing pin 23 is formed by cutting a metal (such as SUS (steel special use stainless)), and is biased radially outward from the outer peripheral surface of the fourth lens group unit 20 by a compression coil spring 24. The biasing pin 23 engages with the cam groove 14c provided to the substantially cylindrical main body portion 14a of the cam frame 14 disposed on the outer peripheral surface side of the fourth lens group unit 20, along with the cam pin 22c.

Furthermore, as shown in FIG. 6B, while the cam pins 22a, 22b, and 22c are provided at approximately the same position in the optical axis AX direction, the biasing pin 23 is provided at a position that is more offset to the object side than the cam pins 22a, 22b, and 2c.

Figure 7A:
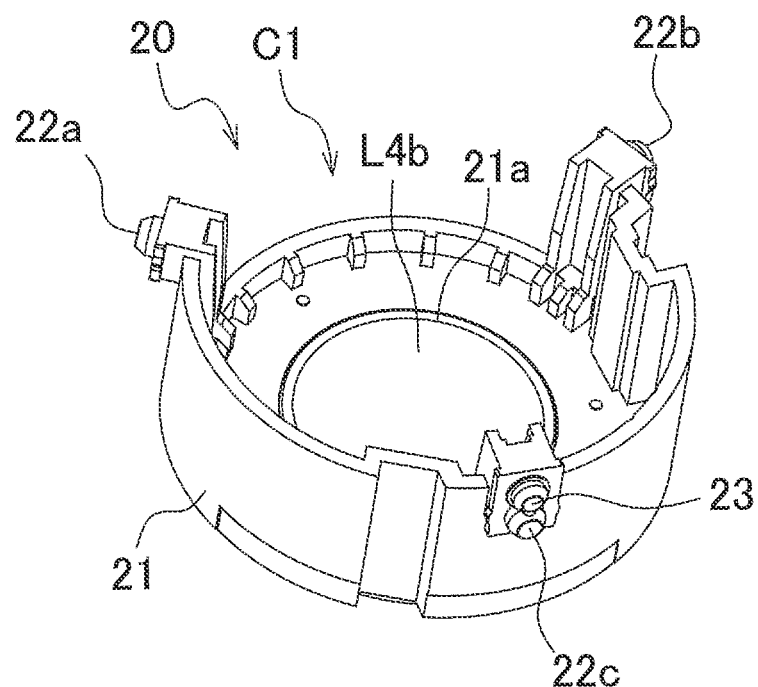
FIG. 7A is an oblique view of the configuration of the biasing pin side of the fourth lens group unit shown in FIG. 4A, etc.
Figure 7B:
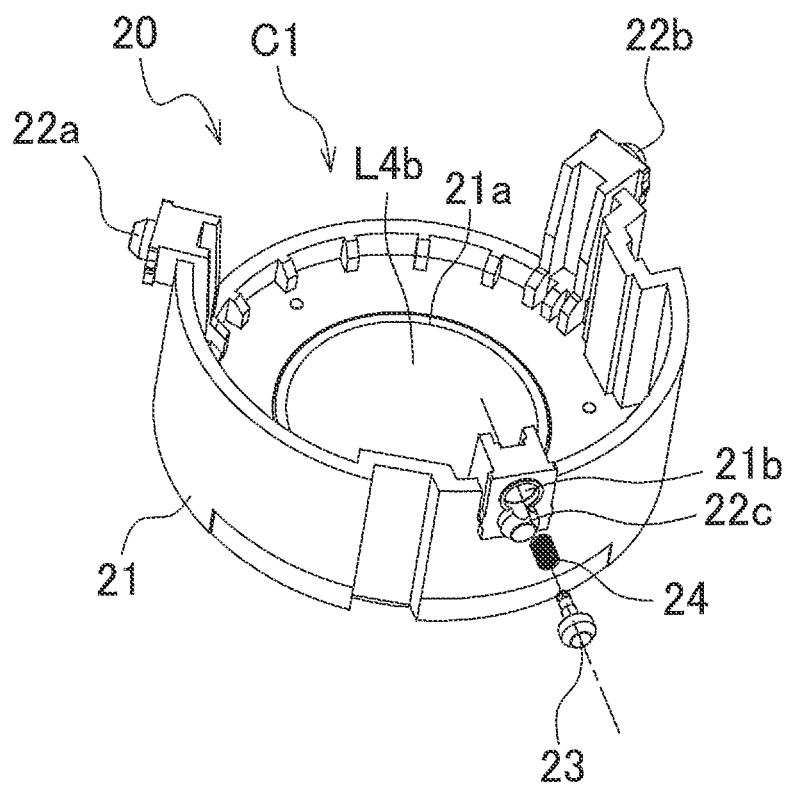
FIG. 7B is an exploded oblique view of the biasing pin in FIG. 7A.

As shown in FIG. 7B, the biasing pin 23 is attached via a compression coil spring 24 to an attachment hole 21b provided at a position adjacent in the optical axis AX direction to the cam pin 22c, on the outer peripheral surface of the main body portion 21.

Also, the biasing pin 23 is temporarily latched in the assembly groove 14f provided to the cam frame 14 (see FIGS. 14A to 14C) so that the fourth lens group unit 20 will not rotate relative to the cam frame 14 when the fourth lens group unit 20 is mounted on the inner peripheral surface side of the cam frame 14 during assembly (discussed below).

Consequently, the fourth lens group unit 20 provided with the biasing pin 23 can be prevented from being unintentionally rotated relative to the cam frame 14.

The assembly of the lens barrel 10 will be discussed in detailed below.

The compression coil spring 24 is disposed to be sandwiched between the attachment hole 21b and the biasing pin 23 in a state of having been inserted into the attachment hole 21b. When the biasing pin 23 is then attached to the attachment hole, the compression coil spring 24 contracts, and the biasing pin 23 applies a biasing force outward in the radial direction.

Also, as shown in FIGS. 7A and 7B, the substantially cylindrical main body portion 21 of the fourth lens group unit 20 has a cutout C1 that is formed between the cam pin 22a and the cam pin 22b so as to be cut in the optical axis AX direction.

Figure 8A:
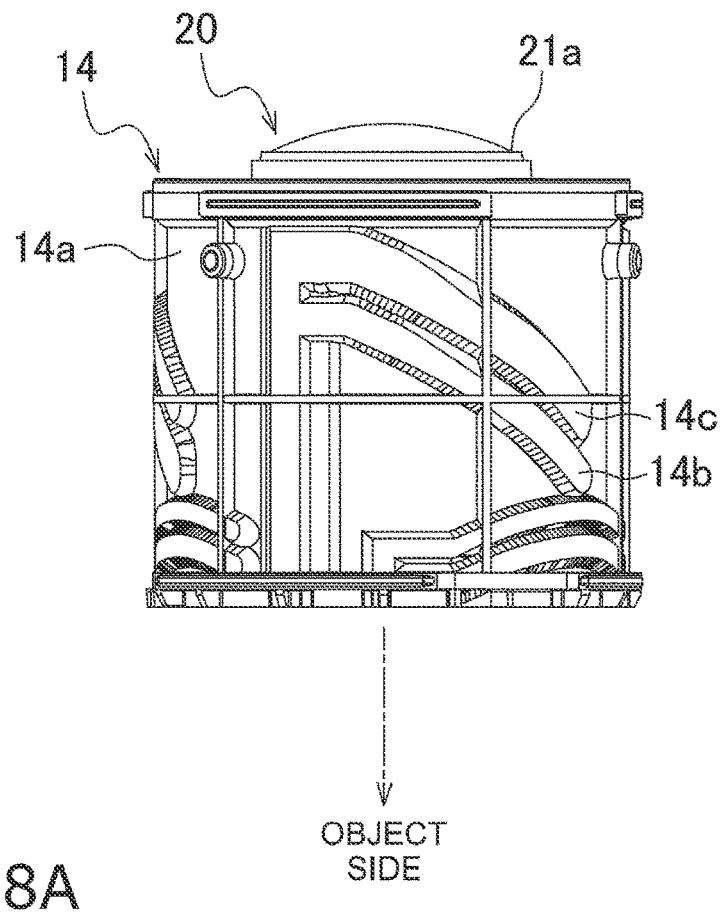
FIG. 8A is a see-through view showing the relation between cam pins provided to the fourth lens group unit in FIG. 4A, etc., and the cam frame disposed on the outer peripheral side of the fourth lens group unit.
Figure 8B:
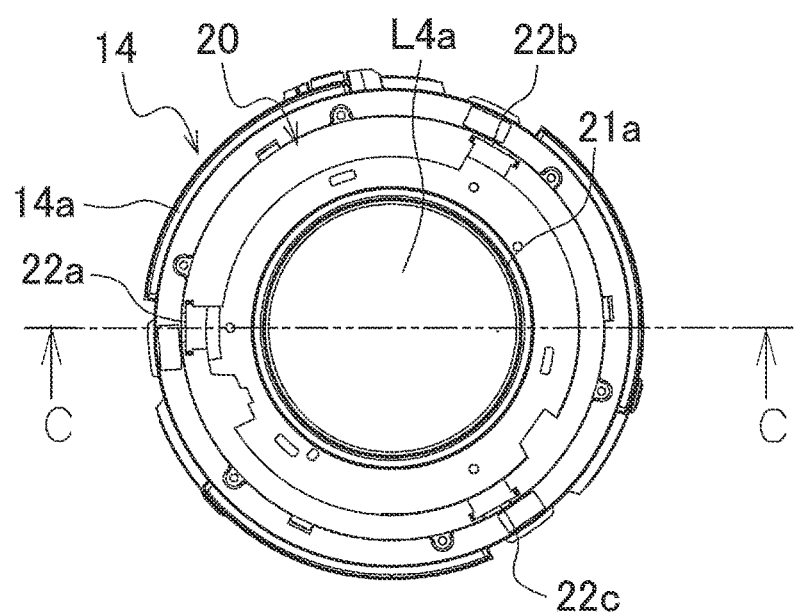
FIG. 8B is a top view of a state in which the fourth lens group unit and the cam frame shown in FIG. 8A are assembled.

Here, as shown in FIGS. 8A and 8B, when the fourth lens group unit 20 is mounted on the inner peripheral surface side of the cam frame 14, the cam pins 22a and 22b are engaged with cam grooves 14c, and the cam pin 22c and the biasing pin 23 are engaged with a cam groove 14c, via the assembly grooves 14d and 14f (discussed below; see FIGS. 14A and 14B) of the cam frame 14.

Figure 9:
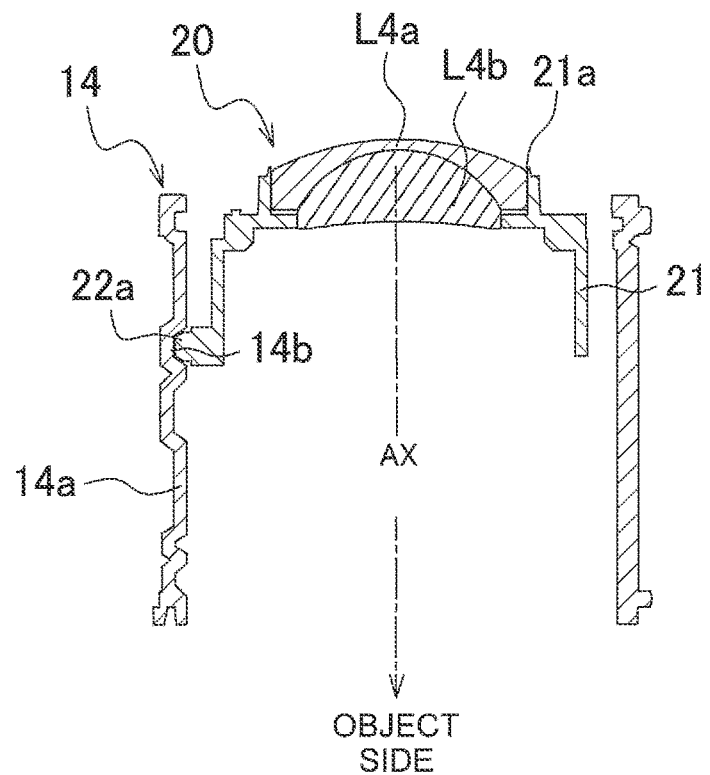
FIG. 9 is a cross-sectional view along the C-C line in FIG. 8B.

At this point, as shown in FIG. 9, the cam pin 22a and the like that are made of resin engage with the cam grooves 14c of the cam frame 14, and when the cam frame 14 rotates around the optical axis AX, the cam pins 22a, 22b, and 22c engaged with the cam grooves 14c move along the cam grooves 14c, causing the fourth lens group unit 20 to move back and forth in the optical axis AX direction with respect to the cam frame 14.

Figure 10A:
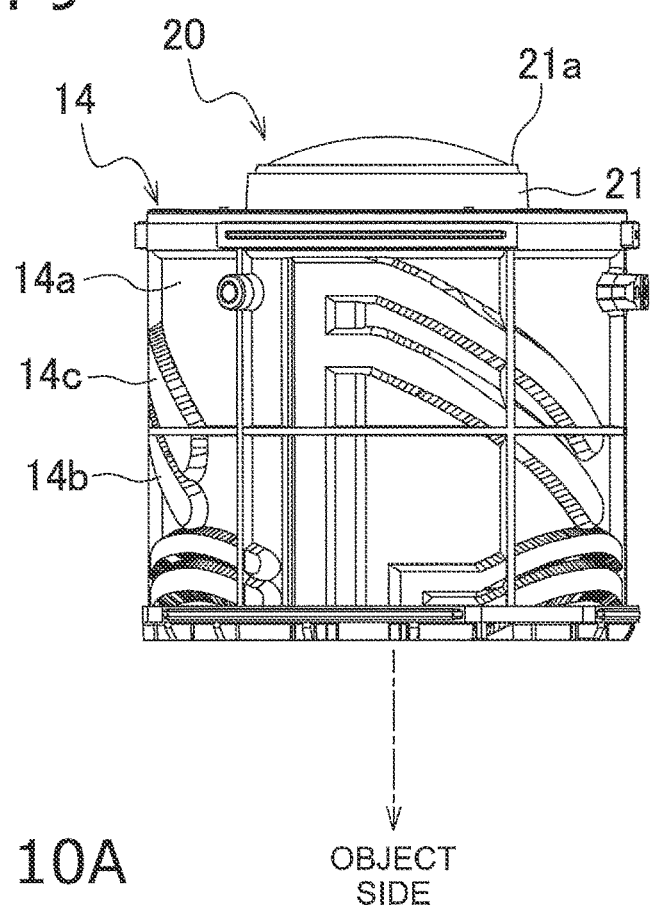
FIG. 10A is a see-through view showing the relation between the biasing pin and the cam pins provided to the fourth lens group unit in FIG. 4A, etc., and the cam frame disposed on the outer peripheral side of the fourth lens group unit.
Figure 10B:
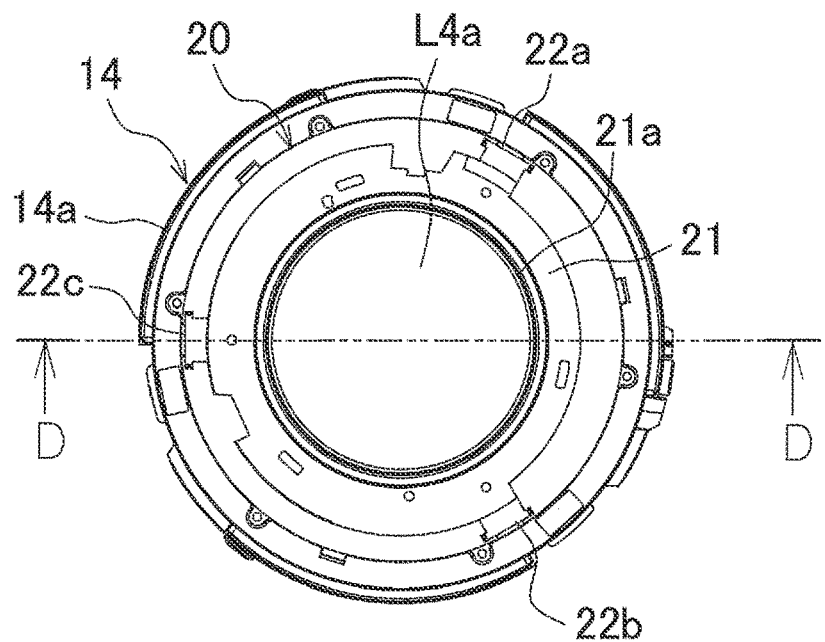
FIG. 10B is a top view of a state in which the fourth lens group unit and the cam frame in FIG. 10A are assembled.
Figure 11:
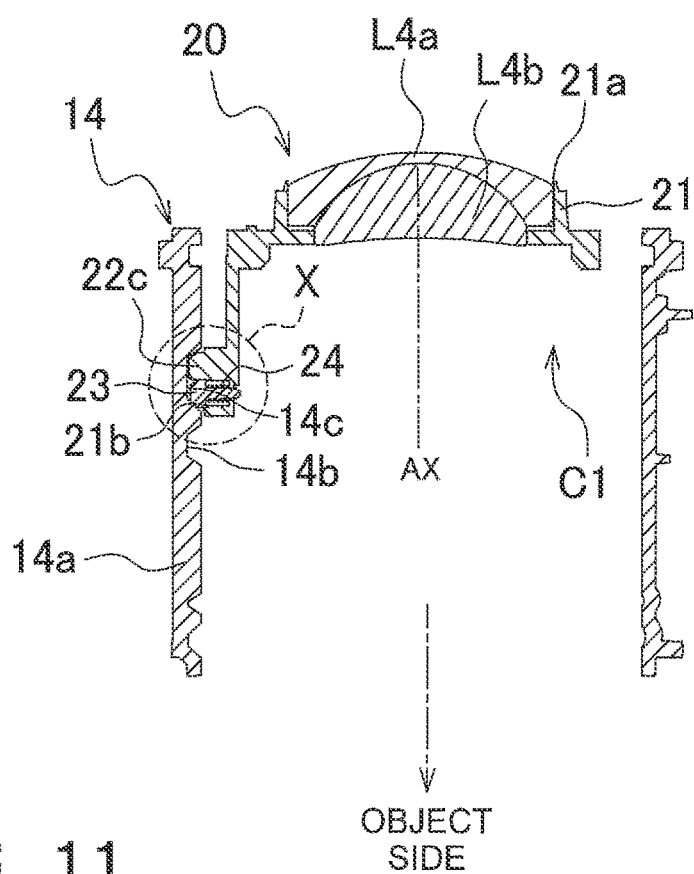
FIG. 11 is a cross-sectional view along the D-D line in FIG. 10B.

Meanwhile, the biasing pin 23 is biased outward in the radial direction by the compression coil spring 24 in a state of protruding outward in the radial direction. Therefore, as shown in FIGS. 10A and 10B, when the fourth lens group unit 20 is mounted on the inner peripheral surface side of the cam frame 14, as shown in FIG. 11, a biasing force is imparted in a state in which the cam pin 22c disposed adjacent to the biasing pin 23 is engaged with the a cam groove 14c that is wider than the other cam grooves 14c through which the cam pins 22a and 22b, which are provided independently and are not adjacently disposed, move in an engaged state. That is, of the three phases of cam grooves 14c through which the cam pins 22a, 22b, and 22c move in an engaged state, the cam groove 14c of one phase corresponding to the cam pin 22c disposed adjacent to the biasing pin 23 is formed to be wider than the other cam grooves 14c.

Figure 12:
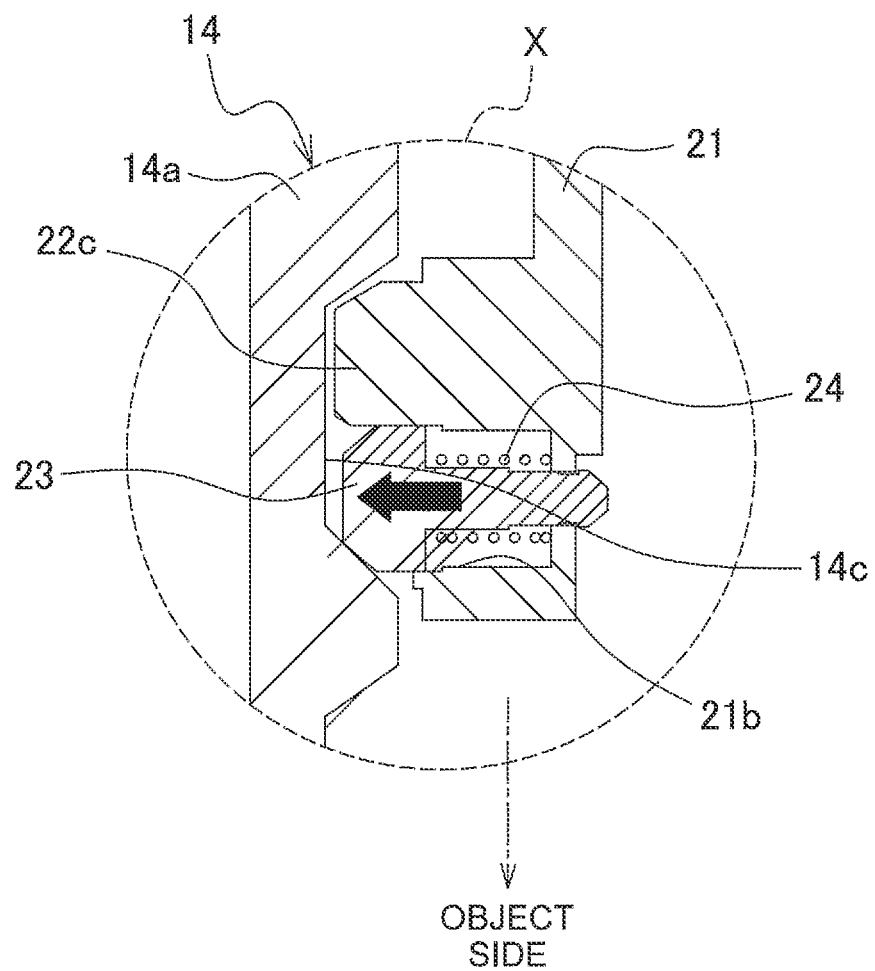
FIG. 12 is a detail view of the X portion in FIG. 11.

Here, as shown in FIG. 12, the biasing pin 23 imparts a biasing force outward in the radial direction to the fourth lens group unit 20 by means of the compression coil spring 24, which suppresses the occurrence of backlash in the fourth lens group unit 20 with respect to the cam frame 14.

Assembly of Cam Frame 14 and Fourth Lens Group Unit 20

The assembly of the cam frame 14 and the fourth lens group unit 20 included in the lens barrel 10 of this embodiment will be described below with reference to FIGS. 13 to 15.

Figure 13:
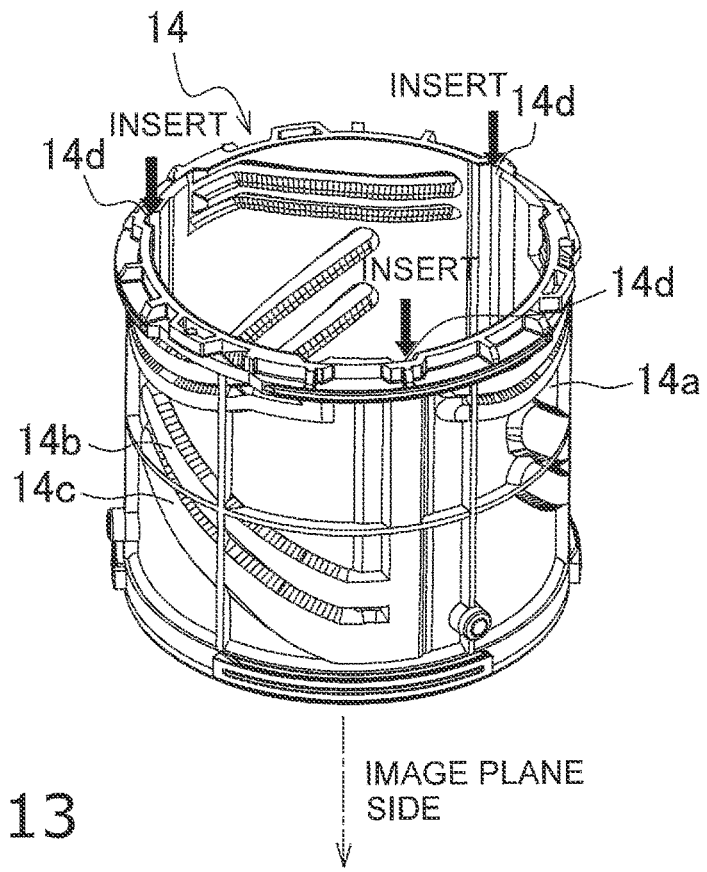
FIG. 13 is an oblique view of the configuration of the end portion of the cam frame shown in FIG. 3 on the side where the fourth lens group unit is mounted.

FIG. 13 shows a state in which the object side in the optical axis direction of the cam frame 14 described above is facing up.

In assembling the cam frame 14 and the fourth lens group unit 20, the fourth lens group unit 20 provided with the cam pins 22a to 22c and the biasing pin 23 is mounted on the inner peripheral surface side of the cam frame 14 along the direction of the arrow in the drawing with respect to the cam frame 14 shown in FIG. 13.

More precisely, as shown in FIG. 13, the cam pins 22a to 22c and the biasing pin 23 provided to the fourth lens group unit 20 are inserted into the assembly grooves 14d provided along the optical axis direction and communicating with the end portion on the object side in the optical axis direction. The cam pins 22a to 22c and the biasing pin 23 guide the cam pins 22a to 22c and the biasing pin 23 to the cam grooves 14c via the assembly grooves 14f shown in FIG. 14A.

The assembly grooves 14f are provided contiguously with the cam grooves 14c. When the fourth lens group unit 20 is mounted on the cam frame 14 and assembled, the cam pins 22a to 22c and the biasing pin 23 move in an engaged state and are guided to the cam grooves 14c.

Figure 14A:
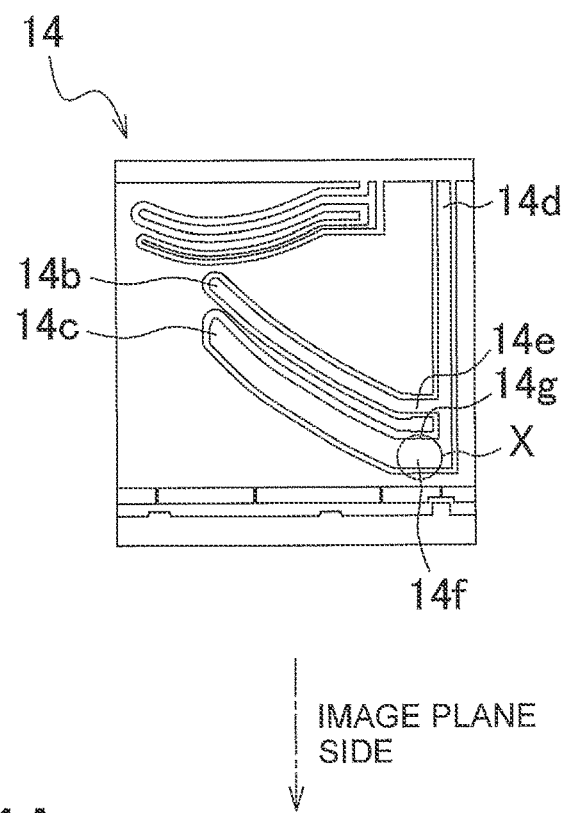
FIG. 14A is a developed view showing cam grooves provided to the cam frame in FIG. 13.

As shown in FIG. 14A, the assembly grooves 14d and 14f include an assembly groove (first groove) 14d provided along the optical axis direction and an assembly groove (second groove) 14f provided along the peripheral direction.

Figure 14B:
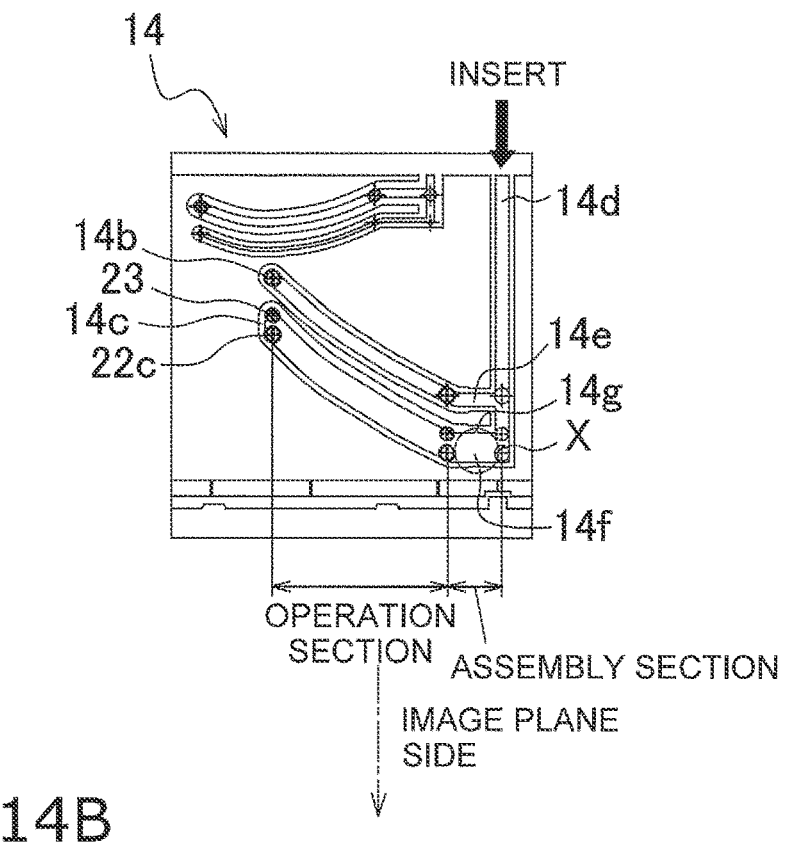
FIG. 14B is a developed view showing the section (assembly section, operation section) in which the cam pins and the biasing pin move within the cam groove in FIG. 14A.

As shown in FIG. 14B, when the fourth lens group unit 20 has been inserted along the optical axis direction, the assembly groove (first groove) 14d moves in the optical axis direction from the portion communicating with the end of the cam frame 14 on the object side in a state in which the cam pins 22a to 22c and the biasing pin 23 are engaged. The assembly groove (second groove) 14f is provided substantially along the peripheral direction such that its first end is contiguous with the assembly groove 14d, and its second end, on the opposite side from the first end, is contiguous with the cam groove 14c.

The cam pins of the second and third lens group units 15 move while engaged with the assembly grooves 14e.

The assembly groove 14f is a groove through which the cam pin 22c and the biasing pin 23 move while engaged, and has a concave portion 14g for latching the biasing pin 23.

When the fourth lens group unit 20 is assembled in the cam frame 14, the concave portion 14g engage with the biasing pin 23 at a specific latching position that is ahead of where the assembly groove 14f is connected to the cam groove 14c, and temporarily holds the biasing pin 23.

Figure 14C:
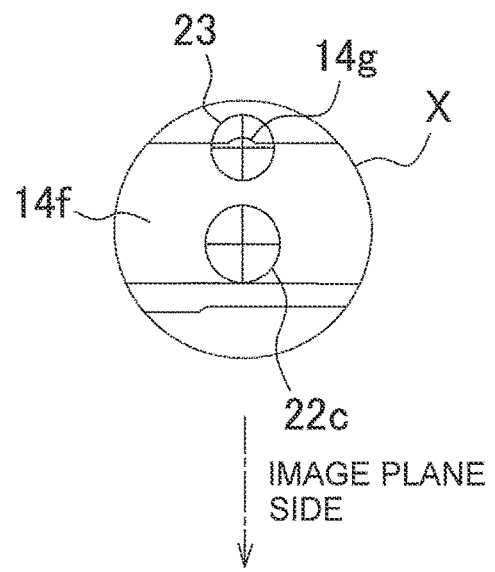
FIG. 14C is a detail view of the X portion in FIG. 14B.

More precisely, as shown in FIG. 14C, etc., the concave portion 14g is a recess that is formed in one wall surface of the assembly groove 14f, into which the outer peripheral surface of the substantially cylindrical biasing pin 23 is fitted, thereby temporarily restricting the rotation of the fourth lens group unit 20 relative to the cam frame 14.

The latching of the biasing pin 23 in the concave portion 14g can be easily released by manually rotating the fourth lens group unit 20 relative to the cam frame 14 using the elastic force of the biasing pin 23 in the radial direction.

At this point, when the fourth lens group unit 20 is manually rotated relative to the cam frame 14, the biasing pin 23 moves in the direction of retracting in the radial direction along the wall surface of the concave portion 14g. As a result, the elastic force of the biasing pin 23 in the radial direction can be utilized to unlatch the biasing pin 23 from the concave portion 14g without deforming the cam frame 14 or other such parts.

Here, as shown in FIG. 14B, the cam frame 14 includes an assembly section corresponding to the assembly grooves 14d and 14f in which the cam pins 22a to 22c and the biasing pin 23 move when the fourth lens group unit 20 is assembled into the cam frame 14, and an operation section corresponding to the cam groove 14c in which the cam pins 22a to 22c and the biasing pin 23 move during photography with the camera 1.

The assembly section is a section in which the cam pins 22a to 22c and the biasing pin 23 engage and move when the lens barrel 10 is assembled, and as shown in FIG. 14B, includes a first section in the optical axis direction running along the assembly groove 14d, and a second section in the peripheral direction running along the assembly groove 14f. The ends of the second section are connected to the assembly groove 14d and the cam groove 14c.

The operation section is a section in which the cam pins 22a to 22c and the biasing pin 23 engage and move when the lens barrel 10 is attached to the camera 1 and photography is performed, with the side connected to the assembly section being the wide-angle end, and the end on the opposite being the telephoto end.

With the lens barrel 10 in this embodiment, as described above, when the fourth lens group unit 20 is mounted on the cam frame 14 during assembly, the biasing pin 23 provided to the fourth lens group unit 20 functions as a latch by being temporarily held in the concave portion 14g provided in the assembly section of the cam frame 14.

Consequently, as shown in FIG. 15, in a state in which the first lens group unit 13, the cam frame 14, the second and third lens group units 15, and the fourth lens group unit 20 have been assembled, this prevents unintentional rotation of the cam frame 14 so that the parts become out of phase in mounting to the inner peripheral surface side of the focus ring unit 11, which could otherwise make assembly more difficult, such as the inability to insert into the focus ring unit 11.

Furthermore, after assembly is complete, the fourth lens group unit 20 and the like can be manually rotated with respect to the cam frame 14, and the elasticity of the biasing pin 23 provided for preventing backlash can be utilized to easily unlatch from the concave portion 14g.

Main Features

The lens barrel 10 of this embodiment comprises the substantially cylindrical fourth lens group unit 20 that holds the lenses L4a and L4b, and the substantially cylindrical cam frame 14. The fourth lens group unit 20 holds the lenses L4a and L4b on the inner peripheral surface side, and has the cam pins 22a to 22c and the biasing pin 23 protruding in the radial direction. The substantially cylindrical cam frame 14 is disposed substantially coaxially with the fourth lens group unit 20, is rotated relative to the fourth lens group unit 20 to move the lenses L4a and L4b in the optical axis direction, and has the plurality of cam grooves 14c, the assembly grooves 14d and 14f, and the concave portion 14g. The plurality of cam grooves 14c are formed in a direction intersecting the optical axis direction in order to move the lenses L4a and L4b in the optical axis direction, and are engaged with the plurality of cam pins 22a to 22c and the biasing pin. The assembly grooves 14d and 14f are provided contiguously with the cam grooves 14c, are engaged with the cam pins 22a to 22c and the biasing pin 23 when the fourth lens group unit 20 is mounted and assembled, and guide the cam pins 22a-22c and the biasing pin 23 from the end portion in the optical axis direction to the cam grooves 14c. The concave portion 14g is provided to the assembly groove 14f and holds the biasing pin 23 at a specific latching position that is ahead of where the assembly grooves 14f are connected to the cam grooves 14c when the fourth lens group unit 20 is assembled.

Consequently, in the step of assembling the lens barrel 10, relative rotation between the cam frame 14 and the fourth lens group unit 20 is restricted in the assembled state, which allows the cam frame 14 to be temporarily held in the same assembly phase.

Therefore, as shown in FIG. 15, in inserting the assembly including the assembled cam frame 14 and fourth lens group unit 20 on the inner peripheral surface side of the focus ring unit 11, assembly can be completed more smoothly.

This makes assembly easier than in the past.

Other Embodiments

An embodiment of the present invention was described above, but the present disclosure is not limited to or by the above embodiment, and various modifications are possible without departing from the gist of the disclosure.

(A)

In the above embodiment, an example was given in which the biasing pin 23, which was elastic in the radial direction, was engaged in the concave portion 14g provided to the assembly groove 14f of the cam frame 14. However, the present disclosure is not limited to this.

For example, the cam pin that is locked to the concave portion or other such latching portion is not limited to the biasing pin, and may instead be a cam pin that is not biased in the radial direction.

In other words, the concave portion or other such latching portion may be configured not as an assembly groove in which the biasing pin engages and moves, but as being provided in the assembly groove in which the biasing pin engages and moves.

However, as in the configuration of the above embodiment, providing a latching portion (concave portion) to the assembly groove corresponding to the biasing pin allows a back and forth function produced by elasticity of the biasing pin in the radial direction to be utilized make a smooth transition from a state of being latched to the latching portion (concave portion) to an unlatched state.

(B)

In the above embodiment, an example was given in which the concave portion 14g was provided as the latching portion that temporarily held the biasing pin 23 in the assembly groove 14f. However, the present disclosure is not limited to this.

For example, a configuration may be used in which a protrusion provided to an assembly groove may be used as a latching portion for temporarily holding the biasing pin (cam pin) in the assembly groove.

(C)

In the above embodiment, an example was given in which the biasing pin 23 was temporarily held in the assembly groove 14f by the concave portion 14g provided to one side wall (wall surface) of the assembly groove 14f. However, the present disclosure is not limited to this.

For example, concave portion or other such latching portion may be configured to be provided on both side walls (wall surfaces) of the assembly groove.

(D)

In the above embodiment, an example was given in which the biasing pin 23 provided on the outer peripheral surface of the fourth lens group unit 20 was latched to the concave portion 14g provided to the assembly groove 14f of the cam frame 14. However, the present disclosure is not limited to this.

For example, a cam pin provided to another lens frame, such as the second lens group unit, may be configured to be latched to with the latching portion (concave portion, etc.) of an assembly groove provided to the cam frame.

That is, the lens frame of the present disclosure is not limited to the fourth lens group unit, and may be some other lens frame.

(E)

In the above embodiment, the example was given in which the biasing pin 23 was disposed adjacent to the cam pin 22c on the outer peripheral surface of the fourth lens group unit 20. However, the present disclosure is not limited to this.

For example, the configuration may instead be a lens frame in which cam pins are provided independently.

(F)

In the above embodiment, an example was given in which the fourth lens group unit 20 was mounted on the inner peripheral surface side of the cam frame 14, and the cam pins 22a to 22c and the biasing pin 23 provided to the fourth lens group unit 20 protruded outward in the radial direction. However, the present disclosure is not limited to this.

For example, the lens frame may be mounted on the outer peripheral surface side of the cam frame, and the cam pins provided on the inner peripheral surface of the lens frame may protrude radially inward.

(G)

In the above embodiment, as shown in FIG. 14B, an example was given in which the concave portion 14g was provided on the side of the assembly groove 14f into which the fourth lens group unit 20 was inserted (the object side in the optical axis direction). However, the present disclosure is not limited to this.

For example, the configuration may be such that a latching portion such as a concave portion is provided on the wall surface of the assembly groove on the side where the lens frame is inserted (the image plane side in the optical axis direction).

INDUSTRIAL APPLICABILITY

The lens barrel of the present disclosure exhibits the effect of making assembly easier than in the past, and as such can be widely applied to various kinds of lens barrel.

REFERENCE SIGNS LIST 1 camera
2 camera body
10 lens barrel
11 focus ring unit
12 zoom ring
13 first lens group unit
13a main body portion
13b rectilinear groove
14 cam frame (cam barrel)
14a main body portion
14b cam groove
14c cam groove
14d assembly groove (first groove)
14e assembly groove
14f assembly groove (second groove)
14g concave portion (latching portion)
15 second and third lens group units
16 rear frame unit
20 fourth lens group unit (lens frame)
21 main body portion
21a lens holding portion
21b attachment hole
22a, 22b cam pin (first cam pin)
22c cam pin (second cam pin)
23 biasing pin (cam pin)
24 compression coil spring
AX optical axis
C1 cutout
L4a, L4b lens (lens group)

The invention claimed is:

1. A lens barrel, comprising:
one or more lens groups;
a substantially cylindrical lens frame that holds the lens group and has a plurality of cam pins that protrude in a radial direction; and
a substantially cylindrical cam barrel that is disposed substantially coaxially with the lens frame, configured to be rotated relative to the lens frame to move the lens group in an optical axis direction, and has a plurality of cam grooves that are formed in a direction intersecting the optical axis direction and are engaged with the plurality of cam pins in order to move the lens group in the optical axis direction, assembly grooves that are provided contiguously with the cam grooves, configured to engage with the cam pins in a mounting and assembly of the lens frame, and configured to guide the cam pins from an end portions in the optical axis direction to the cam grooves, and latching portions that are provided to the assembly grooves and configured to hold the cam pins at specific latching positions that are ahead of where the assembly grooves are connected to the cam grooves when the lens frame is installed.

2. The lens barrel according to claim 1,
wherein the plurality of cam pins include a biasing pin configured to impart a biasing force in the radial direction, and first cam pins that are provided at substantially equal angular intervals in a peripheral direction from the biasing pin.

3. The lens barrel according to claim 2,
wherein the latching portions are provided to the assembly grooves in which the biasing pin engages and moves.

4. The lens barrel according to claim 2,
wherein the plurality of cam pins further have a second cam pin disposed adjacent to the biasing pin along the optical axis direction.

5. The lens barrel according to claim 4,
wherein the second cam pin is molded from a resin.

6. The lens barrel according to claim 2,
wherein the first cam pin is molded from a resin.

7. The lens barrel according to claim 2,
wherein the biasing pin is molded from a metal material.

8. The lens barrel according to claim 2,
wherein two of the first cam pins are provided, and
the biasing pin is disposed at approximately equal angular intervals in the peripheral direction of the lens frame with respect to the two first cam pins.

9. The lens barrel according to claim 2,
wherein the biasing pin is provided at a position offset from the first cam pin in the optical axis direction.

10. The lens barrel according to claim 1,
wherein the cam barrel includes an assembly section corresponding to the assembly grooves in which the cam pins move when the lens frame is assembled into the cam barrel, and an operation section corresponding to the cam grooves in which the cam pins move during photography.

11. The lens barrel according to claim 1,
wherein the assembly grooves have:
a first groove that is provided along the optical axis direction so that when the lens frame is inserted into the cam barrel along the optical axis direction, the cam pins move in an engaged state, and
a second groove that is provided along a substantially peripheral direction so that a first end thereof is connected to the first groove and a second end opposite to the first end is connected to the cam grooves.

12. The lens barrel according to claim 11,
wherein the latching portion is a concave portion formed in one of wall surfaces constituting the second groove included in the assembly grooves.

13. The lens barrel according to claim 12,
wherein the plurality of cam pins include a biasing pin configured to impart a biasing force in the radial direction, and first cam pins that are provided at substantially equal angular intervals in the peripheral direction from the biasing pin, and
the concave portion is provided on the wall surface of the second groove with which the biasing pin is engaged.

14. A camera, comprising:
the lens barrel according to claim 1; and
a camera body to which the lens barrel is attached.

* * * * *